(12) United States Patent
Zhu (10) Patent No.: US 11,172,218 B2
(45) Date of Patent: Nov. 9, 2021

(54) MOTION ESTIMATION (71) Applicant: SZ DJI TECHNOLOGY CO., LTD., Shenzhen (CN)

(72) Inventor: Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/017,216

(22) Filed: Sep. 10, 2020

(65) Prior Publication Data
US 2020/0413090 A1 Dec. 31, 2020

Related U.S. Application Data (63) Continuation of application No. PCT/CN2018/085063, filed on Apr. 28, 2018.

(51) Int. Cl.
*H04N 19/527* (2014.01)
*H04N 19/139* (2014.01)
*H04N 19/513* (2014.01)

(52) U.S. Cl.
CPC ......... *H04N 19/527* (2014.11); *H04N 19/139* (2014.11); *H04N 19/521* (2014.11)

(58) Field of Classification Search
CPC .. H04N 19/527; H04N 19/139; H04N 19/521; H04N 5/144
See application file for complete search history.

(56) References Cited

U.S. PATENT DOCUMENTS

| | | | | |
|---|---|---|---|---|
| 9,354,709 B1 * | 5/2016 | Heller | ..................... | G06F 3/017 |
| 2008/0008353 A1 | 1/2008 | Park et al. | | |
| 2010/0208086 A1 | 8/2010 | Kothandaraman et al. | | |
| 2011/0229056 A1 * | 9/2011 | Robertson | ............... | G06T 7/248 |
| | | | | 382/294 |
| 2013/0345973 A1 * | 12/2013 | Covello | ............. | H04N 5/23248 |
| | | | | 701/509 |
| 2014/0005932 A1 * | 1/2014 | Kozak | .................. | G01C 21/005 |
| | | | | 701/446 |
| 2016/0286130 A1 | 9/2016 | Ryu et al. | | |
| 2017/0078576 A1 | 3/2017 | Ryu et al. | | |
| 2019/0045211 A1 * | 2/2019 | Pohl | ....................... | H04N 19/51 |
| 2019/0313103 A1 * | 10/2019 | Giladi | .................. | H04N 19/142 |

FOREIGN PATENT DOCUMENTS

| | | |
|---|---|---|
| CN | 101009021 A | 8/2007 |
| CN | 101087413 A | 12/2007 |
| CN | 101281650 A | 10/2008 |
| CN | 101339661 A | 1/2009 |
| CN | 101511022 A | 8/2009 |

(Continued)

OTHER PUBLICATIONS

The World Intellectual Property Organization (WIPO) International Search Report and Written Opinion for PCT/CN2018/085063 dated Feb. 3, 2019 7 pages.

*Primary Examiner* — Nasim N Nirjhar (74) *Attorney, Agent, or Firm* — Anova Law Group, PLLC (57) ABSTRACT

A motion estimation method includes calculating a global camera motion vector for a region of an image frame, calculating a global estimated motion vector for the region of the image frame, and determining a global motion vector for the region based on the global camera motion vector and the global estimated motion vector.

16 Claims, 7 Drawing Sheets

(56) References Cited

FOREIGN PATENT DOCUMENTS

| | | | |
|---|---|---|---|
| CN | 102257817 | A | 11/2011 |
| CN | 103765898 | A | 4/2014 |
| CN | 106375659 | A | 2/2017 |
| CN | 106534692 | A | 3/2017 |
| CN | 106688232 | A | 5/2017 |

* cited by examiner

MOTION ESTIMATION

CROSS-REFERENCE TO RELATED APPLICATION

This application is a continuation of International Application No. PCT/CN2018/085063, filed Apr. 28, 2018, the entire content of which is incorporated herein by reference.

TECHNICAL FIELD

The present disclosure relates to video coding technique and, more particularly, to a method and system for motion estimation and video coding.

BACKGROUND

Mobile cameras, i.e., cameras often used in a motion environment, have been developed for a wide range of applications. For example, an aerial vehicle, such as an unmanned aerial vehicle, often carries a camera for photo or video capturing, which can be used in, e.g., surveillance, search and rescue operations, exploration, or other fields. As another example, a camera may be mounted on a hand-held gimbal for photo or video capturing while the use is walking around. A sport camera is often mounted on, e.g., a helmet worn by a user for photo or video capturing while the user is performing a sport activity.

A video captured by a camera is often encoded/compressed by an encoder to save storage space and/or transmission bandwidth. In some encoding methods, the encoder divides a frame into a plurality of blocks. To encode a block in the current frame, the encoder searches for a block in a previously-encoded frame that is similar to the block in the current frame and, if the search is successful, encodes the block by using a vector pointing from the position of the block in the current frame to the position of the block in the previously-encoded frame. This vector is also referred to as a "motion vector."

Sometimes, the movement of one block in a frame is not just caused by the movement of the block itself, but can be a combined effect of the movement of the block itself and the movement of the entire frame. The movement of the entire frame is also referred to as a "global movement," and can be represented by a global motion vector. Usually, the encoder determines the global motion vector first and then uses the global motion vector as a search start point to search for the similar block.

A mobile camera usually uses a hardware encoder for video encoding. To save cost, the search area in which the similar block is searched for is usually limited. Since a mobile camera usually moves relatively fast and has a relatively complicated kinematic model, a limited search area sometimes does not provide desired matching. Therefore, it is important to provide a good search start point. That is, it is important to accurately estimate the global motion vector of the entire frame.

SUMMARY

In accordance with the present disclosure, there is provided a motion estimation method including calculating a global camera motion vector for a region of an image frame, calculating a global estimated motion vector for the region of the image frame, and determining a global motion vector for the region based on the global camera motion vector and the global estimated motion vector.

Also in accordance with the present disclosure, there is provided a video coding method including determining one or more global motion vectors each corresponding to one of one or more regions of a first image frame and encoding a second image frame based on the first image frame and the one or more global motion vectors. Determining the one or more global motion vectors includes, for each of the one or more regions, calculating a global camera motion vector for the region, calculating an global estimated motion vector for the region, and determining a global motion vector for the region based on the global camera motion vector and the global estimated motion vector.

Also in accordance with the present disclosure, there is provided an image processing device including a processor and a memory coupled to the processor. The memory stores instructions that, when executed by the processor, cause the processor to calculate a global camera motion vector for a region of an image frame, calculate a global estimated motion vector for the region of the image frame, and determine a global motion vector for the region based on the global camera motion vector and the global estimated motion vector.

Also in accordance with the present disclosure, there is provided an image processing device including a processor and a memory coupled to the processor. The memory stores instructions that, when executed by the processor, cause the processor to determine one or more global motion vectors each corresponding to one of one or more regions of a first image frame and encode a second image frame based on the first image frame and the one or more global motion vectors. Determining the one or more global motion vectors includes, for each of the one or more regions, calculating a global camera motion vector for the region, calculating an global estimated motion vector for the region, and determining a global motion vector for the region based on the global camera motion vector and the global estimated motion vector.

Also in accordance with the present disclosure, there is provided an image capturing device configured to capturing a video and an image processing device coupled to the image capturing device. The image processing device includes a processor and a memory coupled to the processor. The memory stores instructions that, when executed by the processor, cause the processor to determine one or more global motion vectors each corresponding to one of one or more regions of an image frame of the video. Determining the one or more global motion vectors includes, for each of the one or more regions, calculate a global camera motion vector for the region, calculate a global estimated motion vector for the region, and determine a global motion vector for the region based on the global camera motion vector and the global estimated motion vector.

DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings and the specification to refer to the same or like parts.

Figure 1:
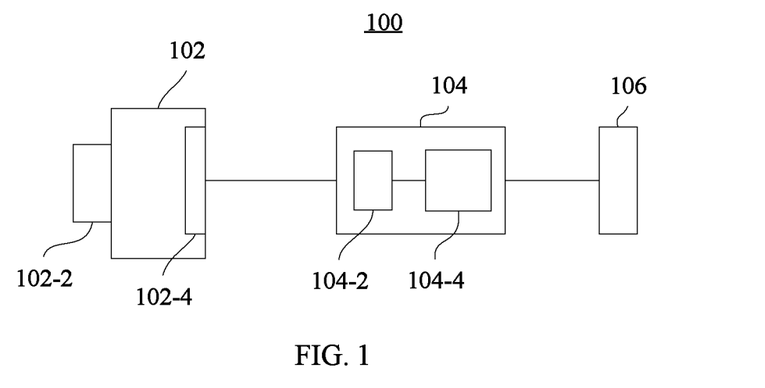
FIG. 1 shows a schematic structural diagram of an imaging system according to an example embodiments.

FIG. 1 shows a schematic structural diagram of an example imaging system 100 consistent with the disclosure. The imaging system 100 can be, for example, carried by a mobile vehicle, such as an unmanned aerial vehicle (UAV), or mounted on a hand-held gimbal. In some embodiments, the imaging system 100 can be installed in and serve as an imaging component of a smart phone. As shown in FIG. 1, the imaging system 100 includes an image capturing device 102 and an image processing device 104 coupled to the image capturing device 102.

The image capturing device 102 includes a lens or lens set 102-2 and an image sensor 102-4, and can be, for example, a camera, a camcorder, or any device having a photographing function, such as a smart phone, or a component of any of those enumerated above that has a photographing function. The image capturing device 102 is configured to capture still images, e.g., photos, and/or moving images, e.g., videos, using light projected by the lens or lens set 102-2 onto the image sensor 102-4. Hereinafter, the term "image" is used to refer to either a still image or a moving image. The image sensor 102-4 can be, for example, an opto-electronic sensor, such as a charge-coupled device (CCD) sensor, a complementary metal-oxide-semiconductor (CMOS) sensor, or a thin-film transistor (TFT) sensor. The image capturing device 102 is further configured to transmit the captured images to the image processing device 104. In some embodiments, the image capturing device 102 may include a memory (not shown) for storing, either temporarily or permanently, the captured images.

The image processing device 104 is configured to process, such as encoding, the images, e.g., videos, captured by the image capturing device 102 according to a method consistent with the disclosure, such as one of the example methods described below. As shown in FIG. 1, the image processing device 104 includes one or more memories 104-2 and one or more processors 104-4 coupled to the one or more memories 104-2. In some embodiments, the one or more memories 104-2 can also store some or all of the images captured by the image capturing device 102, such as videos to be processed by the image processing device 104. The one or more memories 104-2 also store a computer-executable program including program codes or instructions that can be executed by the one or more processors 104-4 to perform a method consistent with the disclosure, such as one of the example methods described below. The one or more processors 104-4 are configured to execute the program codes or instructions to perform the method consistent with the disclosure, such as one of the example methods described below.

Each of the one or more memories 104-2 can include a non-transitory computer-readable storage medium, such as a random access memory (RAM), a read only memory, a flash memory, a hard disk storage, or an optical media. Each of the one or more processors 104-4 can include any suitable hardware processor, such as a microprocessor, a micro-controller, a central processing unit (CPU), a graphic processing unit (GPU), a network processor (NP), a digital signal processor (DSP), an application specific integrated circuit (ASIC), a field-programmable gate array (FPGA), or another programmable logic device, discrete gate or transistor logic device, discrete hardware component.

In some embodiments, as shown in FIG. 1, the imaging system 100 further includes a transmitter 106 coupled to the image processing device 104. The transmitter 106 is configured to transmit data, including unprocessed and/or processed images, such as raw and/or encoded videos, to a receiving terminal, such as a smart electronic device, a TV, or a remote controller of the imaging system 100. The program codes or instructions stored in the one or more memories 104-2 can also instruct the one or more processors 104-4 to control the transmitter 106 to transmit the data.

In some embodiments, the imaging system 100 further includes a receiver (not shown) configured to receive signals or data, such as control signals for controlling operations of the imaging system 100, from a remote device, such as a remote controller. In some embodiments, the transmitter 106 and the receiver can be integrated in a same component as a transceiver of the imaging system 100 that has both transmitting and receiving functions.

In some embodiments, any two or more of the image capturing device 102, the image processing device 104, and the transmitter 106 can be accommodated in a same housing. In some embodiments, either or both of the image processing device 104 and the transmitter 106 can be integrated as a part of the image capturing device 102.

Consistent with the disclosure, the one or more processors 104-4 can execute the program codes or instructions stored in the one or more memories 104-2 to encode a video captured by the image capturing device 102. A video usually includes a plurality of frames. There may be a correlation between nearby frames such as neighboring frames. That is, nearby frames may be similar to each other. Therefore, one frame may be encoded with reference to another frame, referred to as a "reference frame," or with reference to a plurality of reference frames, so as to reduce the amount of data that needs to be stored and/or transmitted. In this disclosure, applications including one reference frame are described as examples, but the disclosed methods, devices, systems, etc. are also applicable to scenarios including multiple reference frames.

For example, a frame in a video can be divided into a plurality of blocks, such as a plurality of macro blocks (a macro block includes 16×16 pixels, i.e., an area having a width of 16 pixels and a height of 16 pixels). A search can be conducted in the reference frame for a block that is most similar to a block in the frame that is currently being encoded. In this disclosure, the frame that is currently being encoded is also referred to as a "current frame"; the block for which the search is conducted is also referred to as a "current block"; and the block in the reference frame that most similar to the current block is also referred to as a "matching block." A relative displacement between the matching block and the current block is referred to a motion vector corresponding to the current block. The motion vector of a block can be represented by a vector from one point in the current block to a corresponding point in the matching block.

Figure 2:
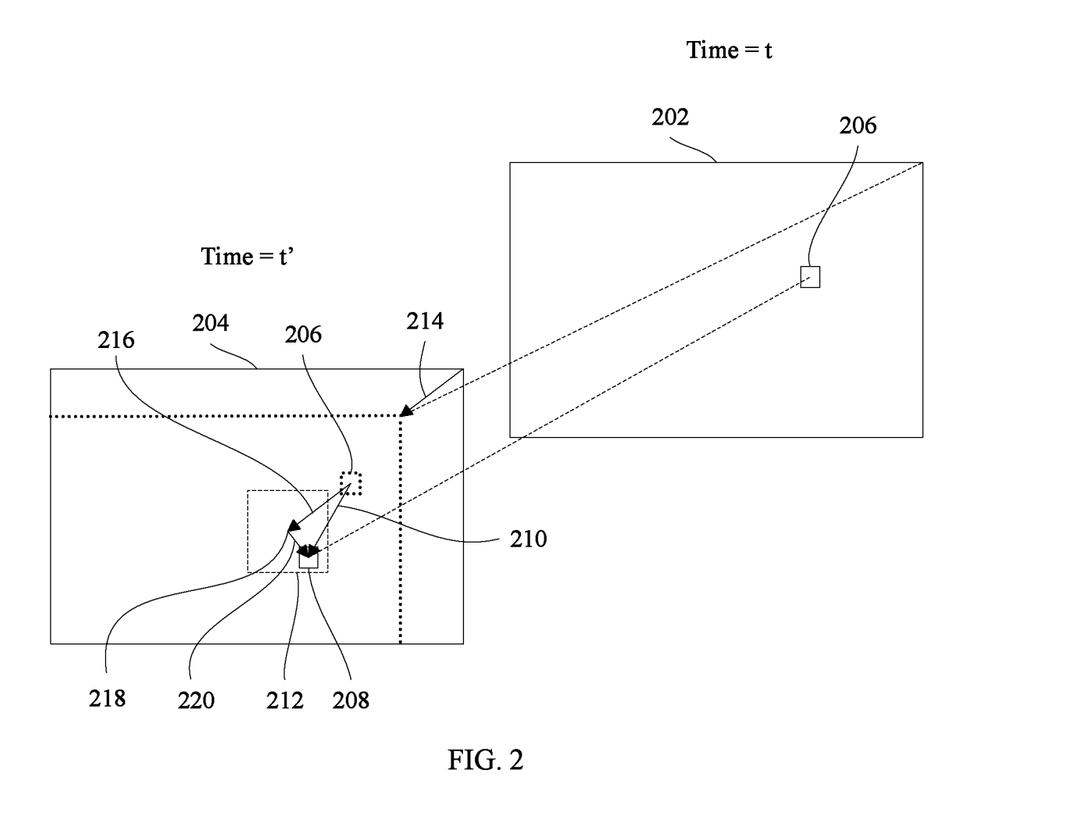
FIG. 2 schematically shows motion vectors associated with a video including a current frame and a reference frame taken at different times according to an example embodiment.

FIG. 2 schematically shows motion vectors associated with a video including a current frame 202 taken at time t and a reference frame 204 taken at time t'. Time t' can be before or after time t during the process of the image capturing device 102 capturing the video. As shown in FIG. 2, in the current frame 202, a current block 206 is at a first location. In the reference frame 204, a matching block 208 is found at a second location. A vector pointing from the first location to the second location represents a motion vector 210 corresponding to the current block 206. FIG. 2 shows a non-zero vector as an example of the motion vector 210, i.e., the second location is different from the first location. In some embodiments, if the current block 206 does not move during the time period between time t and time t', or if the current block 206 moves back to the first location at time t', the motion vector 210 can be a zero vector, i.e., the second location can be the same as the first location.

If the search for the matching block 208 is conducted throughout the entire reference frame 204, it can be time consuming and can occupy a large amount of computation resources. Therefore, in some embodiments, before the search is conducted, a search area 212 is determined, within which the search for the matching block 208 is conducted. A search area is also referred to as a "search scope." The size of the search area 212 may depend on the hardware performance, which may be determined by the cost of the hardware. For example, a more advanced processor may provide a faster computation speed and hence a larger search area can be set, but the cost for the processor can be higher. On the other hand, a low performance processor may be cheaper but then a relatively smaller search area needs to be set to reduce the time spent on searching.

In some embodiments, the search area 212 can have a width of, e.g., 64 pixels, 128 pixels, or 256 pixels, and a height of, e.g., 64 pixels or 80 pixels. As one example, the search area 212 can be an area of 64×64 pixels. In the example shown in FIG. 2, the search area 212 has a square shape. However, the shape of the search area 212 does not have to be so limited. In some other embodiments, the search area 212 can have any regular shape such as a circular shape, a triangular shape, a pentagonal shape, a hexagonal shape, or an octagonal shape, or an irregular shape.

The movement of a block from a location in a current frame to another location in a reference frame can be a combined effect of, e.g., an overall movement of the picture, or a portion of the picture, between the current frame and the reference frame, and a movement of the block itself in the picture. For example, as shown in FIG. 2, from the current frame 202 to the reference frame 204, the picture containing the current block 206 moves as a whole. Such a global movement can be represented by a global motion vector 214 shown in FIG. 2.

If the current block 206 does not make any relative movement in the picture, the current block 206 moves along with the picture and such movement can be represented by a motion vector 216 pointing from the current block 206, which is parallel to and has the same length as the global motion vector 214. The motion vector 216 can also be regarded as the global motion vector, and will be referred to as global motion vector 216 hereinafter. In this scenario, the location of the current block 206 in the reference frame 204 should be at an end 218 of the global motion vector 216, and the motion vector 210 of the current block 206 can coincide with the global motion vector 216. In some scenarios, the current block 206 moves relative to the picture, and such a relative movement can be represented by a relative motion vector 220 as shown in FIG. 2. In these scenarios, the motion vector 210 that represents the overall movement of the current block 206 can be a combined result of the global motion vector 216 and the relative motion vector 220.

The global motion vector 216 (global motion vector 214) is related to the entire picture as a whole, or a portion of the picture as a whole. The global motion vector 216 can be used as a search start point for searching for the matching block 208. In some embodiments, the search area 212 can be centered at the end of the global motion vector 216 and a search is performed within the search area 212 for the matching block 208. Therefore, a more accurate estimate of the global motion vector 216 (the global motion vector 214) can help to reduce the size of the search area 212 and the amount of computation resources needed for searching.

The global movement of a picture or a portion of the picture can be caused by various factors, such as, for example, a movement (including rotational movement and/or translational movement) of the image capturing device 102, and/or a movement of a majority of objects in the picture, e.g., a movement of the front objects or the background as a whole. For example, when the image capturing device 102 is stationary, a movement of the entire scene being captured or a portion of the scene may result in a global movement of the picture or a portion of the picture. On the other hand, if the scene being captured is not changing but the image capturing device 102 is moving, this movement of the image capturing device 102 may also result in a global movement of the picture or a portion of the picture. In some embodiments, both the scene or a portion of the scene and the image capturing device 102 may move, resulting in a combined global movement of the picture or a portion of the picture. The global motion vector associated with the global movement can be determined (estimated) using a motion estimation method consistent with the disclosure, such as one of the example methods described below.

Figure 3:
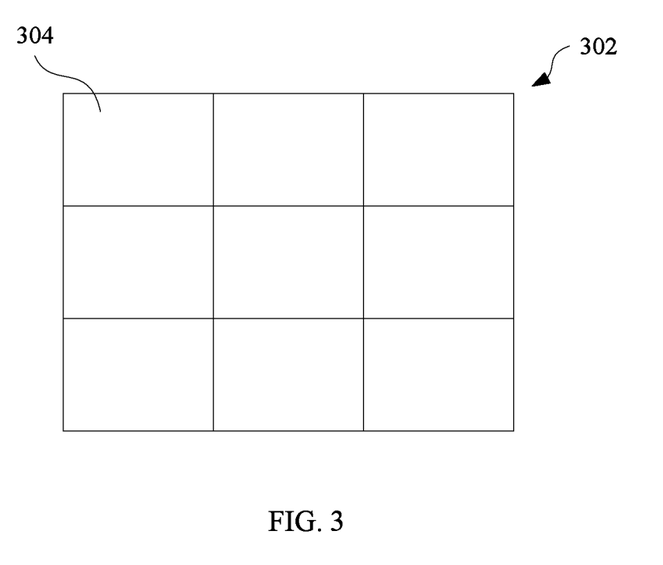
FIG. 3 schematically shows an image frame division according to an exemplary embodiment.

In some embodiments, an image frame can be divided into a plurality of regions and the motion estimation method can be applied to each of the regions to obtain a global motion vector for that region. Dividing the image frame into the plurality of regions can be particularly useful, for example, in situations involving rotation of the image capturing device 102 and/or rotation of the entire scene being captured or a majority portion of the scene. FIG. 3 schematically shows an example image frame division consistent with the disclosure. As shown in FIG. 3, an image frame 302 is divided into nine regions 304 arranged as a three-by-three grid. In some embodiments, the nine regions 304 can have a same shape and a same size. The motion estimation method can be applied to each of the nine regions 304 to obtain a global motion vector for each of the nine regions 304. The search for matching blocks can be performed based on the obtained global motion vectors associated with the various regions 304.

The division of the image frame is not limited to that shown in FIG. 3. In some embodiments, the image frame can be divided into more or fewer than nine regions. For example, the image frame can be divided into four regions arranged as a two-by-two grid. The regions can have a shape other than a rectangular shape, can have different shapes, and can have different sizes. In some embodiments, the motion estimation method can be applied to the entire image frame directly, i.e., the entire image frame can contain only one region.

Figure 4:
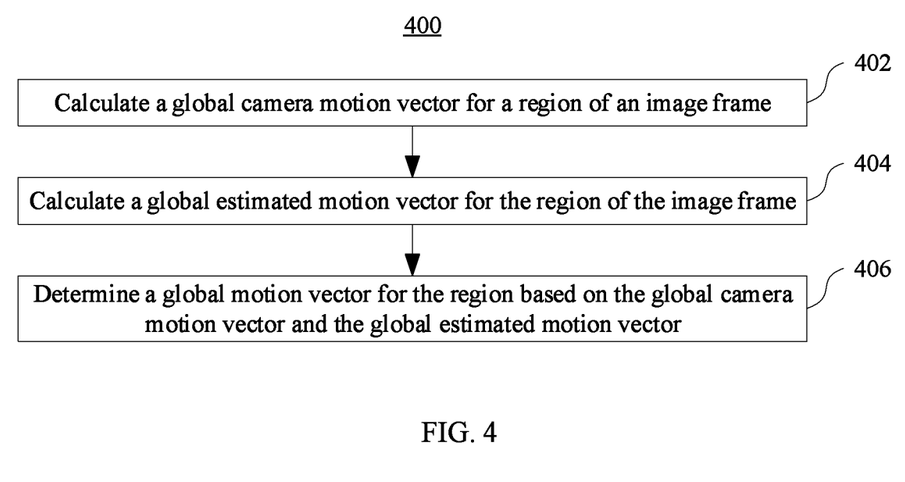
FIG. 4 is a flowchart showing an example motion estimation method according to an example embodiment.

FIG. 4 is a flowchart showing an example motion estimation method 400 consistent with the disclosure. The method 400 can be implemented, for example, in the image processing device 104 and, in particular, be performed by the one or more processors 104-4 according to the program codes or instructions stored in the one or more memories 104-2. As shown in FIG. 4, at 402, a global camera motion vector for a region of an image frame is calculated. At 404, a global estimated motion vector for the region of the image frame is calculated. At 406, a global motion vector for the region is determined based on the global camera motion vector and the global estimated motion vector. The determination of the global motion vector based on the global camera motion vector and the global estimated motion vector is also referred to as a global motion vector fusion.

The image frame can be one frame of a video captured by the image capturing device 102. As described above, an image frame may be divided into a plurality of regions and a global camera motion vector can be determined for each of one or more of the plurality of regions. In some embodiments, the region can be, for example, one of nine regions in the image frame that are arranged as a three-by-three grid, or one of four regions in the image frame that are arranged as a two-by-two grid. In some embodiments, the entire image frame may include only one region and the global camera motion vector can be for the entire image frame.

A camera motion vector refers to a motion vector resulting from a movement of the image capturing device 102. Each pixel may be associated with one camera motion vector, also referred to as a "pixel camera motion vector." A camera motion vector associated with one block is also referred to as a "block camera motion vector" and can be determined based on the pixel camera motion vectors of the pixels in the block. The global camera motion vector for a region of an image frame can be determined based on the block camera motion vectors of the blocks in the region. In some embodiments, when the movement of the image capturing device 102 only involves translational movements, the pixel camera motion vectors of all pixels in the image frame may be the same, and may be the same as the block camera motion vectors, which in turn may be the same as the global camera motion vector for the region.

Therefore, the global camera motion vector can represent a movement of the image or a portion (the region) of the image caused by a movement of the image capturing device 102 capturing the image frame. In some embodiments, the global camera motion vector can be determined based on camera attitude data from an inertial measurement unit (IMU) coupled to the image capturing device 102. In some embodiments, the IMU can be directly connected to the image capturing device 102 and measure the attitude of the image capturing device 102 directly. In some embodiments, the IMU can be connected to another body connected to the image capturing device 102 and measure the attitude of the image capturing device 102 indirectly. The other body can include, for example, a vehicle, such as an unmanned aerial vehicle (UAV), carrying the image capturing device 102, or a hand-held gimbal on which the image capturing device 102 is mounted. The calculation of the global camera motion vector based on the camera attitude data is described in more detail below with reference to FIG. 5.

Figure 5:
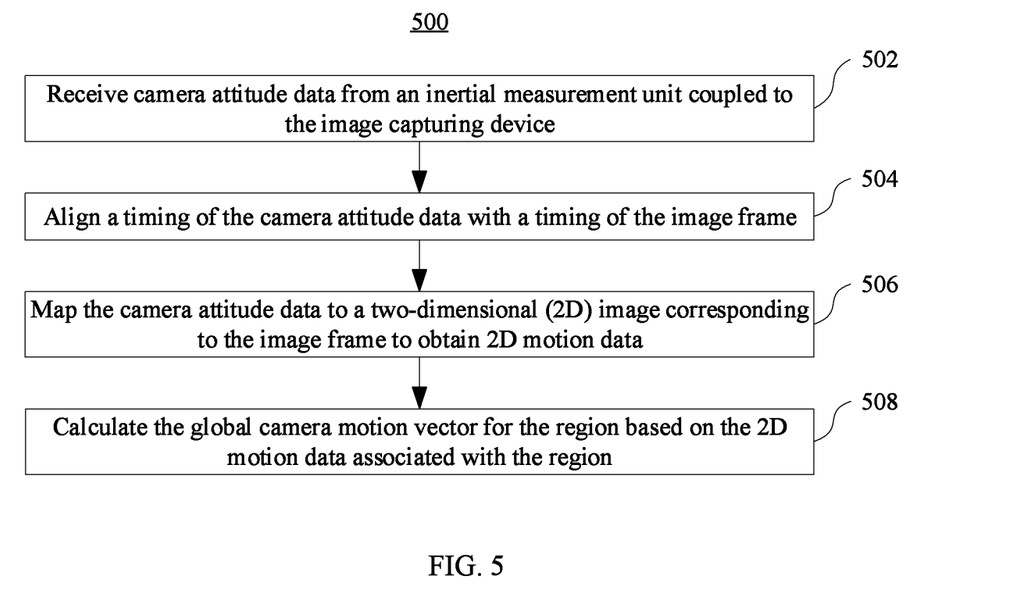
FIG. 5 is a flowchart showing a method for calculating a global camera motion vector for a region of an image frame according to an example embodiment.

FIG. 5 is a flowchart showing an example method 500 for calculating the global camera motion vector for a region of an image frame consistent with the disclosure. As shown in FIG. 5, at 502, the camera attitude data is received from the IMU coupled to the image capturing device 102. The camera attitude data can include data characterizing the movement of the image capturing device 102, including data associated with a rotational movement of the image capturing device 102 and data associated with a translational movement of the image capturing device 102. For example, the camera attitude data can include a speed and/or a displacement of the image capturing device 102 in each of an X-direction, a Y-direction, and a Z-direction of a Cartesian coordinate system in which the image capturing device 102 is located. The camera attitude data can also include an angular speed and/or rotation angle of the image capturing device 102 around each of a yaw-axis, a roll-axis, and a pitch-axis associated with the image capturing device 102.

At 504, a timing of the camera attitude data is aligned with a timing of the image frame. Aligning the timings of the camera attitude data and the image frame can ensure that the camera attitude data being processed is the data associated with the image frame currently being processed.

At 506, the camera attitude data is mapped to a two-dimensional (2D) image corresponding to the image frame to obtain 2D motion data. The camera attitude data from the IMU may include six degrees of freedom, i.e., three degrees of translational movement (X-, Y-, and Z-directions) and three degrees of rotational movement (yaw, roll, and pitch rotations). However, images captured by the image capturing device 102 may only have two degrees of freedom. Therefore, the six-degree-of-freedom camera attitude data needs to be mapped to the two-degree image for further processing. This mapping can be performed according to any suitable method.

At 508, the global camera motion vector for the region is calculated based on the 2D motion data associated with the region. As noted above, sometimes, different blocks in the region may be associated with different block camera motion vectors and different points/pixels in the same block may be associated with different pixel camera motion vectors due to, for example, the involvement of a certain degree of rotation in the movement of the image capturing device 102. Therefore, in some embodiments, calculating the global camera motion vector for the region based on the 2D motion data associated with the region may include calculating block camera motion vectors for a plurality of blocks in the region according to the 2D motion data associated with the region and determining the global camera motion vector based on the block camera motion vectors.

In some embodiments, one of the block camera motion vectors can be selected as the global camera motion vector. Various criteria can be adopted for selecting the one of the block camera motion vectors. For example, one of the block camera motion vectors having a largest absolute value among the block camera motion vectors may be selected as the global camera motion vector. As another example, the block camera motion vectors may be grouped according to their angles with respect to a certain direction and each group may include one or more block camera motion vectors within a certain angle range. One of the block camera motion vectors in a group having the largest number of block camera motion vectors, such as the block camera motion vector having the largest absolute value in this group, may be selected as the global camera motion vector for the region. In some other embodiments, rather than selecting one of the block camera motion vectors, the block camera motion vectors of some or all of the plurality of blocks in the region may be averaged and the average may be used as the global camera motion vector for the region.

The block camera motion vector for a block can be determined based on pixel camera motion vectors of the pixels in the block. Usually, the number of pixels in a block is not large and hence the difference among the pixel camera motion vectors of the pixels in the block may be very small. For example, a macro block may include 16×16 pixels, and a smaller-scale block may include even less, e.g., 8×8 pixels or 4×4 pixels. Compared with an image frame having 1024×768 pixels, 1280×720 pixels, 1920×1080 pixels, or even more pixels, the size of the block is relatively small. Therefore, in some embodiments, the pixel camera motion vector of any pixel in a block can be used as the block camera motion vector of the block. In some embodiments, the pixel camera motion vectors of some or all of the pixels in a block may be averaged and the average can be used as the block camera motion vector of the block.

Calculation of the global estimated motion vector for the region of the image frame (404 in FIG. 4) is described in more detail below. The global estimated motion vector for the region may be determined based on the image frame itself and/or the determined global motion vector from one or more neighboring image frames, without taking into consideration the camera attitude data obtained at the time of capturing the image frame. That is, the global estimated motion vector in some certain degree may be regarded as a "perceived" global motion vector based on the video itself and in some embodiments may be "modified" by the determined global motion vector of one or more neighboring image frames.

Similar to the camera motion vector, each pixel may be associated with one pixel estimated motion vector and each block may be associated with a block estimated motion vector. The global estimated motion vector for the region of the image frame can be determined based on the block estimated motion vectors of the blocks in the region. In some embodiments, calculating the global estimated motion vector for the region may include calculating the block estimated motion vectors of a plurality of blocks in the region and determining the global estimated motion vector for the region based on the block estimated motion vectors of the plurality of blocks in the region.

In some embodiments, weighted averaging of the block estimated motion vectors of the blocks can be performed to obtain the global estimated motion vector. In some embodiments, all of the blocks in the region are used in calculating the global estimated motion vector for the region. In some embodiments, some, i.e., less than all, of the blocks in the region are used in calculating the global estimated motion vector for the region.

To calculate a weighted average of the block estimated motion vectors, weights may need to be assigned to the block estimated motion vectors. In some embodiments, the weight of the block estimated motion vector of a block may be determined based on a confidence level of the block estimated motion vector. That is, the block estimated motion vectors of some blocks may not be trustable and thus may be assigned a lower weight, while the block estimated motion vectors of some blocks may be more trustable and thus may be assigned a higher weight. In some embodiments, certain block estimated motion vectors may be assigned a zero weight because their confidence levels are too low.

Sometimes, the accuracy in calculating the block estimated motion vector for a block may be affected by an unflatness of the block, also referred to as a "block unflatness." The block unflatness of a block reflects how quickly pixel values change across the block, and hence how uniform is the block. The smaller is the value of the block unflatness of a block, the more uniform the block may be. Calculation of the block estimated motion vector for a block may require a certain degree of variation across the block, and thus a more uniform block, i.e., a block having a smaller block unflatness, may have a less accurate or less trustable calculated block estimated motion vector. Therefore, the block unflatness of a block may be used to represent the confidence level of the block estimated motion vector of the block. In some embodiments, the confidence level of the block estimated motion vector of the block can be set to be correlated to, or proportional to, the block unflatness of the block. In some embodiments, the block unflatness of the block can be used directly as the confidence level of the block estimated motion vector of the block.

In some embodiments, in addition to the unflatness, motion distortion may also be taken into consideration in determining the confidence level. That is, the confidence level may include a combined effect of the unflatness and the motion distortion.

Thus, in some embodiments, calculating the global estimated motion vector for the region may further include calculating block unflatnesses of the plurality of blocks. In some embodiments, performing the weighted averaging of the block estimated motion vectors of the blocks may include setting the weight to be zero for the block estimated motion vector of a block having a block unflatness lower than a threshold unflatness.

The block unflatness of a block may be determined based on pixel unflatnesses of the pixels in the block. In some embodiments, calculating the block unflatness of a block may include calculating the pixel unflatnesses of a plurality of pixels in the block and calculating the block unflatness of the block based on the pixel unflatnesses of the plurality of pixels. The plurality of pixels involved in this calculation may include all or less than all of the pixels in the block. In some embodiments, the block unflatness of the block may be calculated by averaging the pixel unflatnesses of the plurality of pixels in the block. In some other embodiments, the block unflatness of the block may be calculated by summing the pixel unflatnesses of the plurality of pixels in the block.

Figure 6A:
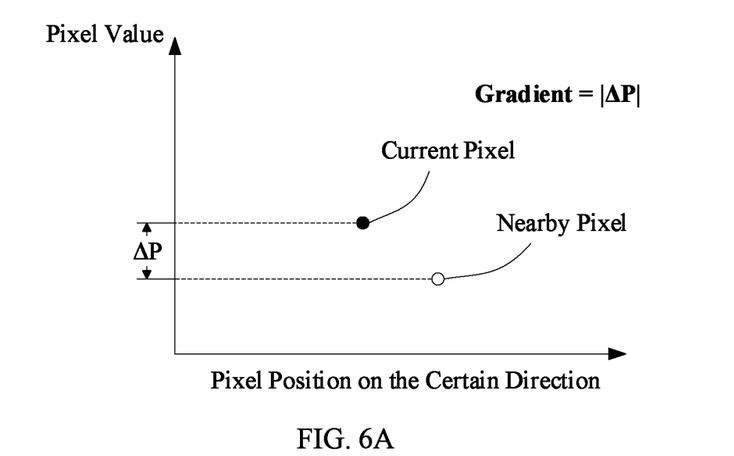
FIGS. 6A-6C schematically show gradient calculation for the current pixel according to example embodiments.
Figure 6B:
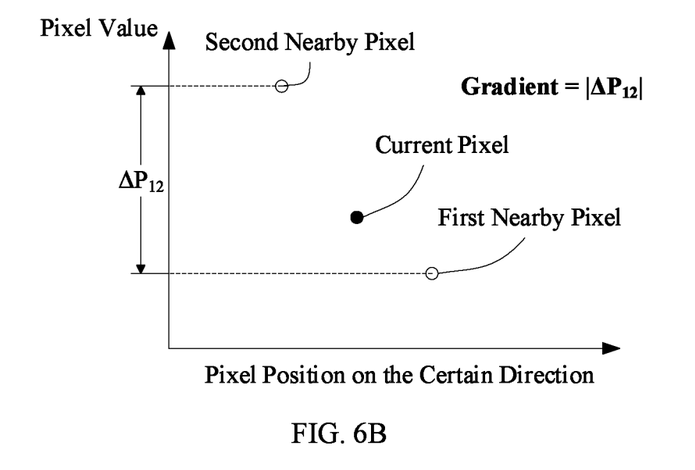
Figure 6C:
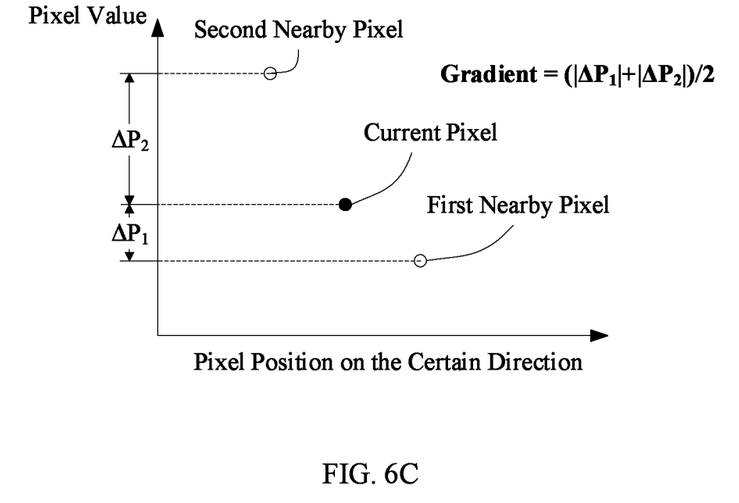

The pixel unflatness of a pixel can be calculated using various methods. In some embodiments, a gradient at a pixel, also referred to as a "current pixel," along a certain direction can be calculated and used as the pixel unflatness of the current pixel. FIGS. 6A-6C schematically show some non-limiting examples of gradient calculation for the current pixel. In some embodiments, as shown in FIG. 6A, the gradient at the current pixel along the certain direction can be determined by calculating an absolute value of a difference (denoted by $\Delta P$ in FIG. 6A) between a pixel value of the current pixel and a pixel value of a nearby pixel in the certain direction, as shown in FIG. 6A. The nearby pixel in the certain direction can be a pixel next to the current pixel in the certain direction or a pixel separated from the current pixel by one or more other pixels in the certain direction. In some embodiments, as shown in FIG. 6B, the gradient at the current pixel along the certain direction can be determined by calculating an absolute value of a difference (denoted by $\Delta P_{12}$ in FIG. 6B) between a pixel value of a first nearby pixel in the certain direction and a pixel value of a second nearby pixel in the certain direction. In some embodiments, as shown in FIG. 6C, the gradient at the current pixel along the certain direction can be determined by calculating an absolute value of a first difference (denoted by $\Delta P_1$ in FIG. 6C) between the pixel value of the first nearby pixel in the certain direction and pixel value of the current pixel, calculating an absolute value of a second difference (denoted by $\Delta P_2$ in FIG. 6C) between the pixel value of the second nearby pixel in the certain direction and the pixel value of the current pixel, and calculating an average of the absolute value of the first difference and the absolute value of the second difference.

In some embodiments, the pixel unflatness of a pixel can be determined based on a first gradient at the pixel along a first direction and a second gradient at the pixel along a second direction different from the first direction. Each of the first and the second gradients can be calculated using a method consistent with the disclosure, such as one of the example methods described above for calculating the gradient along the certain direction. In some embodiments, the pixel unflatness of the pixel can include a sum of the first gradient and the second gradient. In some embodiments, the pixel unflatness of the pixel can include an average of the first gradient and the second gradient.

In some embodiments, the first direction and the second direction can be approximately orthogonal to each other. For example, the first direction and the second direction can be the x-direction (e.g., the width direction) and the y-direction (e.g., the height direction) of the image frame, respectively. As another example, the first direction can be 45° to the positive x-direction and 45° to the positive y-direction, and the second direction can be 45° to the positive x-direction and 45° to the negative y-direction.

In the embodiments described above, a weighted average of the block estimated motion vectors of a plurality of blocks in a region is calculated and used as the global estimated motion vector of the region. In some other embodiments, the block estimated motion vector of one of the blocks in the region can be selected as the global estimated motion vector of the region. Selection of the one of the block estimated motion vectors as the global estimated motion vector can be similar to the selection of the one of the block camera motion vectors as the global camera motion vector described above. For example, one of the block estimated motion vectors having a largest absolute value among the block estimated motion vectors may be selected as the global estimated motion vector. As another example, the block estimated motion vectors may be grouped according to their angles with respect to a certain direction and each group may include one or more block estimated motion vectors within a certain angle range. One of the block estimated motion vectors in a group having the largest number of block estimated motion vectors, such as the block estimated motion vector having the largest absolute value in this group, may be selected as the global estimated motion vector for the region.

In some embodiments, the global estimated motion vector for a region of a current image frame can be calculated based on the current image frame and/or one or more nearby image frames. A nearby image frame can be an image frame before, e.g., immediately before, or after, e.g., immediately after, the current image frame in the sequence of encoding or in the sequence of the video. In some embodiments, two nearby image frames can be used for calculating one or more motion vectors associated with the two nearby image frames. The calculation can be pixel based, block based, or region based. For example, the motion vector for a region calculated based on the two nearby image frames can be used as the global estimated motion vector for a corresponding region of the current image frame.

With the global camera motion vector and the global estimated motion vector for a region determined, the global motion vector for the region can be determined based on the global camera motion vector and the global estimated motion vector (406 in FIG. 4). Consistent with the disclosure, the global motion vector for the region can include either the global camera motion vector for the region, the global estimated motion vector for the region, or a combination of the global camera motion vector and global estimated motion vector for the region. The determination of the global motion vector for the region is described in more detail below.

In some embodiments, how the global motion vector for the region is determined can depend on various factors, such as how trustable the global estimated motion vector is. The reliability of the global estimated motion vector can be characterized by a confidence level of the global estimated motion vector. Therefore, in some embodiments, before determining the global motion vector based on the global camera motion vector and the global estimated motion vector, the motion estimation method may further include calculating a confidence level of the global estimated motion vector.

As described above, calculation of the block estimated motion vector for a block may require a certain degree of variation across the block, and hence the block unflatness of the block may be used to represent the confidence level of the block estimated motion vector of the block. Similarly, for a region including a plurality of blocks, an unflatness of the region (an unflatness across the region) may be used to represent the confidence level of the global estimated motion vector of the region. That is, in some embodiments, calculating the confidence level of the global estimated motion vector for the region may include calculating the unflatness of the region. The confidence level of the global estimated motion vector of the region may be positively correlated to, or proportional to, the unflatness of the region. In some embodiments, the unflatness of the region may be directly used as the confidence level of the global estimated motion vector of the region.

In some embodiments, calculating the unflatness of the region may include calculating pixel unflatnesses of a plurality of pixels in the region and calculating the unflatness of the region based on the pixel unflatnesses of the plurality of pixels. The number of pixels selected for calculating the unflatness of the region is not limited and can be determined by various factors such as cost for computation and requirement of accuracy. Selecting less pixels for calculation may reduce the cost for computation while selecting more pixels for calculation may provide a more accurate result. For example, the number of pixels selected for calculating the unflatness can be in the range from 2 to 10000.

In some embodiments, the plurality of pixels for calculating the unflatness may be selected randomly across the region. In some embodiments, the plurality of pixels may include one pixel randomly selected from each of the blocks in the region. In some embodiments, the plurality of pixels may be selected according to a preset selection rule. For example, the region may be equally divided into a plurality of sub-regions and pixels each at a center of one of the sub-regions may be selected for calculating the unflatness. As another example, pixels each at a center of one of the blocks in the region may be selected for calculating the unflatness.

The pixel unflatness of a pixel can be calculated using a method similar to one of those described above associated with the embodiments for calculating the confidence levels of blocks, and hence detailed description thereof is omitted here.

After the pixel unflatnesses of the plurality of pixels in the region are obtained, the unflatness of the region can be calculated based on these pixel unflatnesses. In some embodiments, the pixel unflatnesses of the plurality of pixels can be averaged and the average can be used as the unflatness of the region. In some embodiments, the pixel unflatnesses of the plurality of pixels can be summed and the sum can be used as the unflatness of the region. In some embodiments, the pixel unflatnesses of the plurality of pixels can be compared with a preset threshold value, and a ratio between the number of pixels having a pixel unflatness equal to or higher than the preset threshold value and the number of pixels having a pixel unflatness lower than the preset threshold value can be used as the unflatness of the region.

After the confidence level of the region is obtained, the global motion vector for the region can be determined based on the global camera motion vector and the global estimated motion vector, taking into consideration of the confidence level, as described in more detail below.

Figure 7:
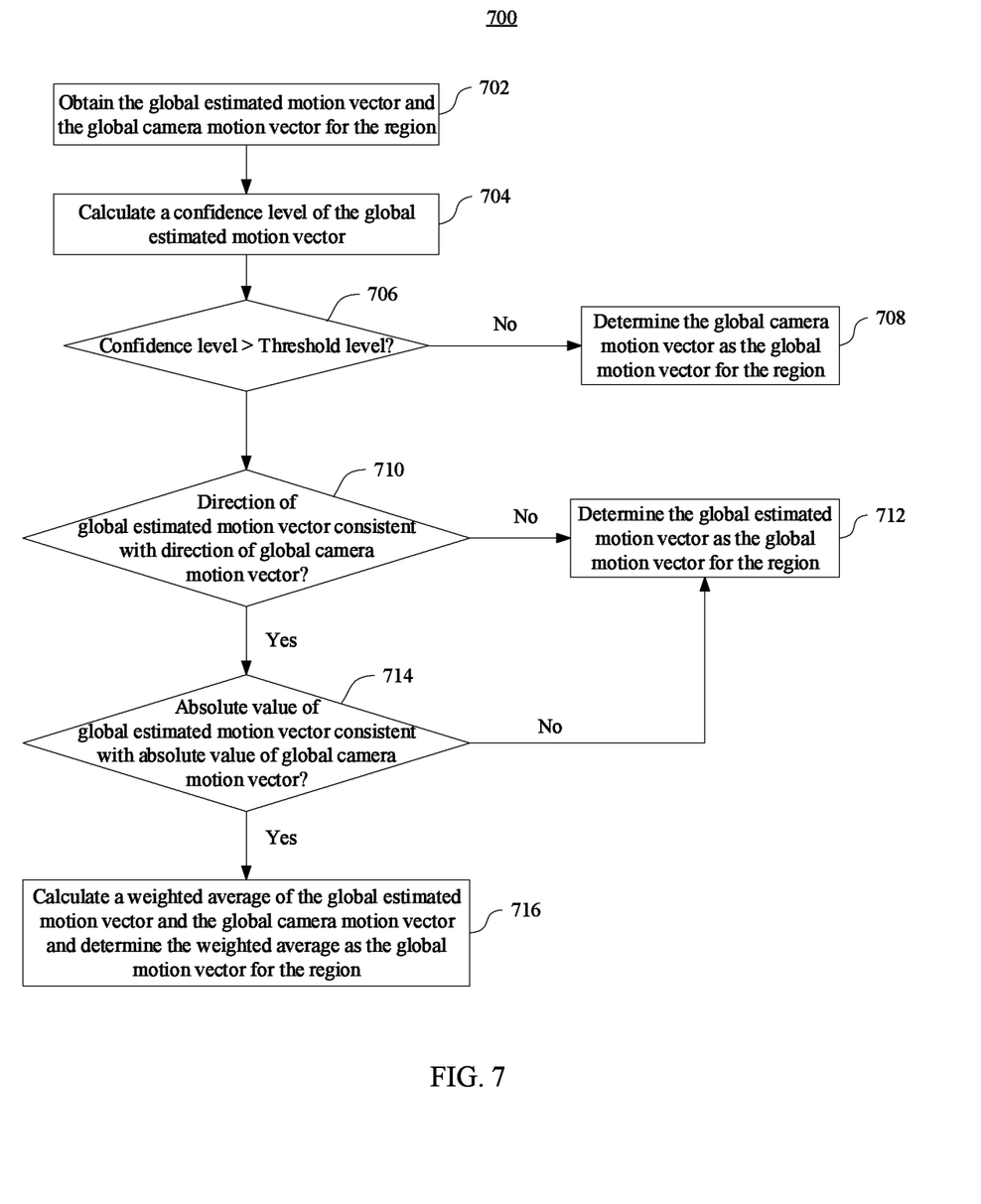
FIG. 7 is a flowchart showing a method for determining a global motion vector for a region according to an example embodiment.

FIG. 7 is a flowchart showing an example method 700 for determining a global motion vector for a region consistent with the disclosure. As shown in FIG. 7, at 702, the global camera motion vector and the global estimated motion vector for the region are obtained. The global camera motion vector and the global estimated motion vector can be obtained using any method consistent with the disclosure, such as one of the example methods described above.

At 704, a confidence level of the global estimated motion vector is calculated. The global estimated motion vector can be calculated using any method consistent with the disclosure, such as one of the example methods described above. As described above, the confidence level of the global estimated motion vector of the region can be positively correlated to an unflatness of the region. In some embodiments, the confidence level can be proportional to, e.g., equal to, the unflatness of the region.

At 706, whether the confidence level is higher than a threshold level is determined. The threshold level can be determined, for example, by prior statistics, e.g., based on data collected during prior estimations.

If the confidence level of the global estimated motion vector is not higher than the threshold level (706: No), the process proceeds to 708, at which the global camera motion vector is determined as the global motion vector for the region. That is, if the confidence level of the global estimated motion vector is too low, it means the global estimated motion vector itself is not trustable. In this case, the global camera motion vector may be more trustable and hence can be used as the global motion vector of the region.

On the other hand, if the confidence level of the global estimated motion vector is higher than the threshold level (706: Yes), the process proceeds to 710, at which it is further determined whether a direction of the global estimated motion vector is consistent with a direction of the global camera motion vector. In some embodiments, whether the direction of the global estimated motion vector is consistent with the direction of the global camera motion vector can be determined based on an angle between the direction of the global estimated motion vector and the direction of the global camera motion vector. In some embodiments, the direction of the global estimated motion vector and the direction of the global camera motion vector can be determined to be consistent with each other if the angle therebetween is smaller than about 90°, e.g., if the angle therebetween is smaller than about 45°, smaller than about 30°, or smaller than about 10°.

If the direction of the global estimated motion vector is not consistent with the direction of the global camera motion vector (710: No), the process proceeds to 712, at which the global estimated motion vector is determined as the global motion vector for the region.

On the other hand, if the direction of the global estimated motion vector is consistent with the direction of the global camera motion vector (710: Yes), the process proceeds to 714, at which it is determined whether an absolute value of the global estimated motion vector is consistent with an absolute value of the global camera motion vector. The absolute value of the global estimated motion vector being consistent with the absolute value of the global estimated motion vector may mean that the two absolute values are close to each other. In some embodiments, the absolute value of the global estimated motion vector may be determined to be consistent with an absolute value of the global camera motion vector if a ratio between the two absolute values is within a ratio range, such as, for example, a ratio range of about 0.5 to about 1 or to about 1.5, a ratio range of about 0.6 to about 1 or to about 1.4, a ratio range of about 0.7 to about 1 or to about 1.3, a ratio range of about 0.8 to about 1 or to about 1.2, a ratio range of about 0.9 to about 1 or to about 1.1, a ratio range of about 0.95 to about 1 or to about 1.05, or a ratio range of about 0.99 to about 1 or to about 1.01. In some embodiments, the absolute value of the global estimated motion vector may be determined to be consistent with the absolute value of the global camera motion vector if the ratio between the two absolute values equal about 1. In some embodiments, the ratio range may depend on a resolution/size of the image frame. In some embodiments, the ratio range may be larger for an image frame having a higher resolution.

If the absolute value of the global estimated motion vector is not consistent with the absolute value of the global camera motion vector (714: No), the process proceeds to 712, i.e., the global estimated motion vector is determined as the global motion vector for the region.

On the other hand, if the absolute value of the global estimated motion vector is consistent with the absolute value of the global camera motion vector (714: Yes), the process proceeds to 716, at which a weighed average of the global estimated motion vector and the global camera motion vector is calculated and determined as the global motion vector for the region. For example, the weighted average can be calculated according to:

$$B \times gmv + (1-B) \times zmv \qquad (1)$$

where gmv and zmv denote the global estimated motion vector and the global camera motion vector of the region, respectively, and B and (1−B) are the weights of gmv and zmv, respectively, which are also referred to as a first global estimated motion vector and a second global estimated motion vector, respectively.

In some embodiments, the weight for the global estimated motion vector and the weight for the global camera motion vector can be the same as each other, i.e., B in Eq. (1) can equal 0.5. That is, an arithmetic average of the global estimated motion vector and the global camera motion vector can be calculated and used as the weighted average.

In some embodiments, the weights B and (1−B) can be different from each other, and can depend on the confidence level of the global estimated motion vector. For example, the higher is the confidence level of the global estimated motion vector, the higher can the weight of the global estimated motion vector be and correspondingly the lower can the weight of the global camera motion vector be. In some embodiments, if the confidence level of the global estimated motion vector is higher than a threshold level, the weight of the global estimated motion vector can be higher than the weight of the global camera motion vector, i.e., B in Eq. (1) can be larger than 0.5. The threshold level for determining the weights of the absolute values of the global estimated motion vector and the global camera motion vector can be different from the same as or different from the threshold level at 706 described above for determining whether to use the global camera motion vector as the global motion vector. In this disclosure, the threshold level at 706 is also referred to as a first threshold level, while the threshold level for determining the weights of the absolute values is also referred to as a second threshold level.

Figure 8:
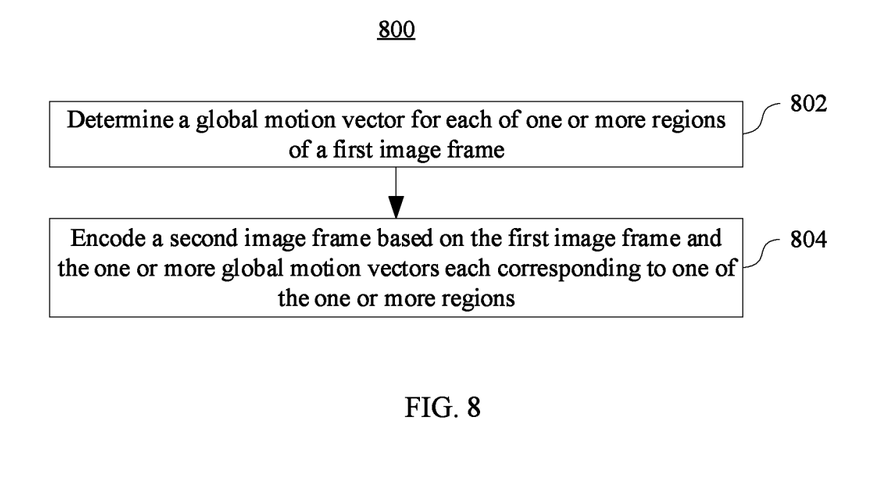
FIG. 8 is a flowchart showing an example video encoding method according to an example embodiment.

After the global motion vectors for the regions of the image frame are obtained, the global motion vectors can be used for encoding the image frame. FIG. 8 is a flowchart showing an example video encoding method 800 consistent with the disclosure. As shown in FIG. 8, at 802, a global motion vector for each of one or more regions of a first image frame are determined. The global motion vector for each of the one or more regions can be determined using a motion estimation method consistent with the disclosure, such as one of the example methods described above. That is, one or more global motion vectors each corresponding to one of the one or more regions can be determined. At 804, a second image frame is encoded based on the first image frame and the one or more global motion vectors. That is, the second image frame can be encoded using the first image frame as a reference frame. In some embodiments, the second image frame can be an image frame before, e.g., immediately before, or after, e.g., immediately after, the first image frame in a video including a sequence of image frames. In some embodiments, the order of encoding the image frames of the video may not be the same as the order of the image frames in the video. In some embodiments, the second image frame can be an image frame before, e.g., immediately before, or after, e.g., immediately after, the first frame in the sequence of image frames being encoded.

The global motion vector of a region can be used as a search start point for determining block motion vectors of blocks in the region. The block motion vector of a block may represent the movement of the block from a position in the first image frame to a corresponding position in the second frame. In some embodiments, encoding the second image frame may include determining the block motion vectors of a plurality of blocks using the one or more global motion vectors as one or more search start points, and encoding the second image frame based on the first image frame and the block motion vectors of the blocks.

Figure 9:
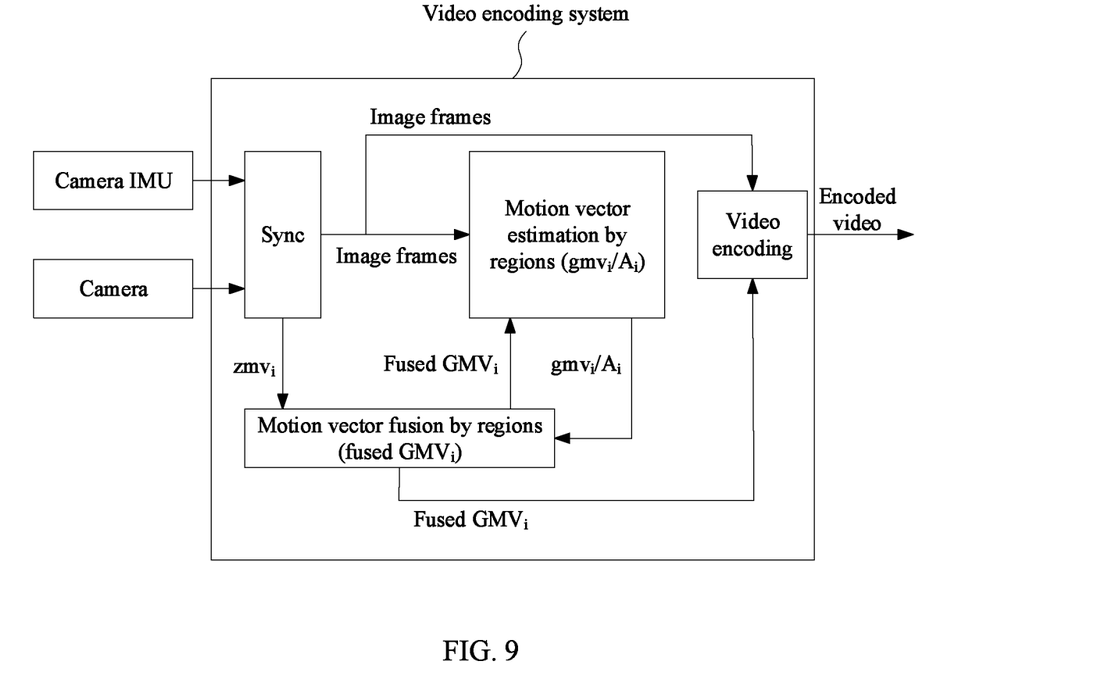
FIG. 9 schematically shows an overall video encoding process according to an example embodiment.

FIG. 9 schematically shows an example overall video encoding process consistent with the disclosure. As shown in FIG. 9, camera attitude data from an IMU coupled to the image capturing device (denoted as "camera" in FIG. 9) and video data from the image capturing device are inputted into a video encoding system. The video encoding system can include, for example, the image processing device 104 described above. In the video encoding system, the camera attitude data and the video data are synchronized by a synchronizer to align the timing of the camera attitude data and the timing of the image frames of the video data. The image frames are inputted to a motion vector estimator for determining global estimated motion vectors. In some embodiments, the motion vector estimator may perform a motion vector estimation by regions to determine a global estimated motion vector $gmv_i$ and its corresponding confidence level $A_i$ for each of one or more regions of a current image frame, based on the current image frame and the global motion vector of the corresponding region in a previously-encoded image frame, where i is a positive integer and used in the subscript of a parameter to denote the parameter of an i-th region in an image frame.

The determined global estimated motion vector $gmv_i$ and its corresponding confidence level $A_i$ for each of the one or more regions are inputted into a motion vector fuser. Further, the global camera motion vector $zmv_i$ for each of the one or more regions of the current image frame is also inputted into the motion vector fuser. The motion vector fuser may perform a motion vector fusion by regions to determine a fused global motion vector (also referred to as a new global motion vector, denoted using upper-case GMV in FIG. 9 to distinguish over the global estimated motion vector denoted using lower-case gmv) for each of the one or more regions based on the global camera motion vector $zmv_i$ and the global estimated motion vector $gmv_i$ for the region, according to a method consistent with the disclosure, such as one of the example methods described above.

The fused/new global motion vector(s) are fed back to the motion vector estimator and can be used in determining the global estimated motion vector(s) for the next image frame to be encoded. Further, the fused/new global motion vector(s) are inputted to the video encoder for encoding the current image frame. The video encoder can output an encoded video for transmitting to a receiver or for storing in a storage medium.

Figure 10:
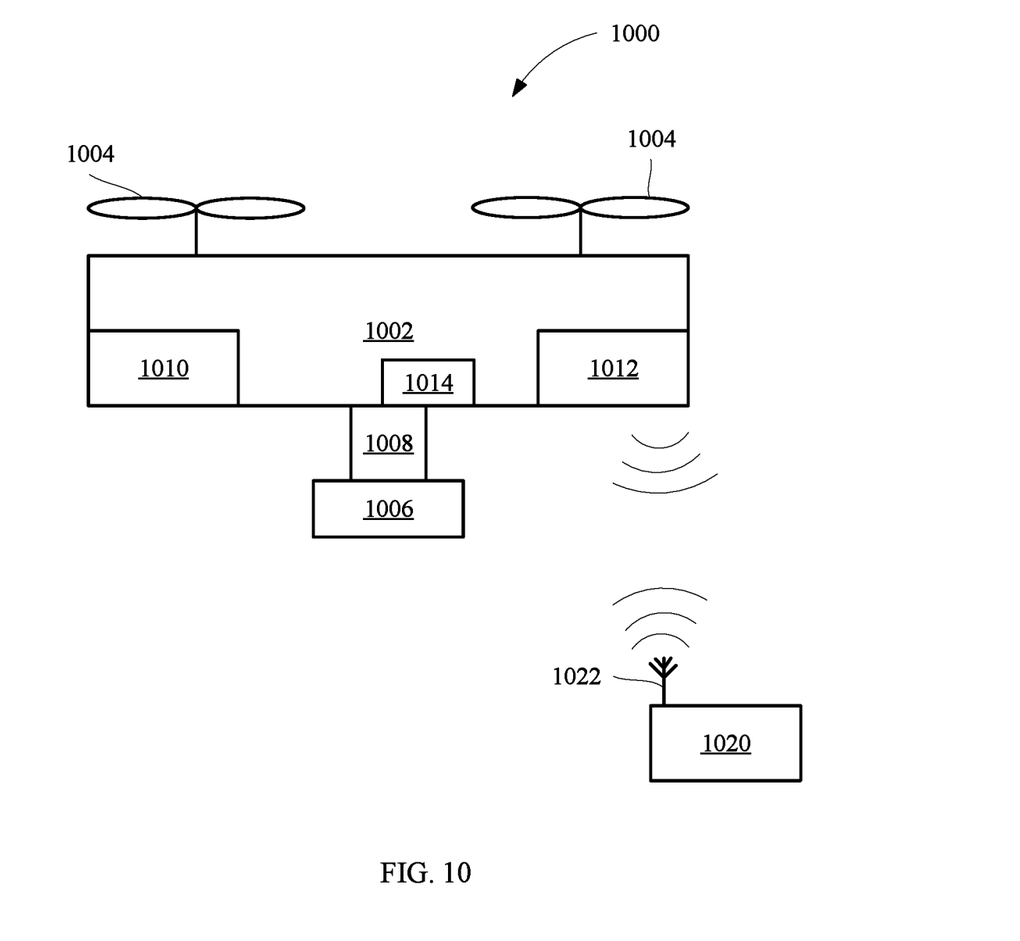
FIG. 10 schematically shows an unmanned aerial vehicle according to an example embodiment.

As described above, the imaging system consistent with the disclosure can be carried by a vehicle, such as an unmanned aerial vehicle (UAV). FIG. 10 schematically shows an example UAV 1000 consistent with the disclosure. As shown in FIG. 10, the UAV 1000 includes a fuselage 1002 and propulsion mechanisms 1004 coupled to the fuselage 1002. The propulsion mechanisms 1004 can enable the UAV 1000 to take off from or land on a surface, and to move or hover in the air.

The UAV 1000 further includes an image capturing device 1006 and a carrier 1008 coupling the image capturing device 1006 to the fuselage 1002. In some embodiments, the image capturing device 1006 can be directly connected to the fuselage 1002 without the carrier 1008. The image capturing device 1006 can be any image capturing device consistent with the disclosure, such as the image capturing device 102 described above.

The UAV 1000 further includes an image processing device 1010 configured to process images (photos and/or videos) captured by the image capturing device 1006 according to a method consistent with the disclosure, such as one of the example methods described above. The image processing device 1010 can be any image processing device consistent with the disclosure, such as the image processing device 104 described above.

The UAV 1000 further includes a transmitter 1012 configured to transmit data, such as encoded videos outputted by the image processing device 1010, to a receiving device 1020, such as a remote controller of the UAV 1000 or an electronic device communicating with the UAV 1000. The transmitter 1012 can be any transmitter consistent with the disclosure, such as the transmitter 106 described above. In some embodiments, the transmitter 1012 can transmit the data wirelessly, which can then be received by the receiving device 1020 through an antenna 1022 of the receiving device 1020.

In some embodiments, as shown in FIG. 10, the UAV 1000 further includes an IMU 1014 configured to detect an attitude of the image capturing device 1006 and generate camera attitude data for processing by the image processing device 1010. The IMU 1014 can be mounted on the fuselage

1002 and coupled to the image capturing device 1006, or can be mounted on the image capturing device 1006 directly. In some embodiments, the image capturing device 1006 may be fixedly connected to the fuselage 1002, i.e., the image capturing device 1006 may not move (translationally or rotationally) with respect to the fuselage 1002. In these embodiments, the IMU 1014 can be mounted on the fuselage 1002 and detect the attitude of the fuselage 1002, which would be the same as the attitude of the image capturing device 1006.

Consistent with the disclosure, an image frame is divided into one or more regions and the global motion vector for each region is determined taking into consideration both the movement of the image capturing device and the movement of objects in the image frame. Therefore, a more accurate global motion vector for using as a search start point can be provided, and hence the search for matching blocks (determining motion vectors for blocks) can be performed at a faster speed and/or lower computation cost, and/or within a smaller search area. The methods, devices, and systems consistent with the disclosure improve the video encoding technology, resulting in an improved encoding efficiency of the video encoder and an improved quality of the rebuilt video.

The processes shown in the figures associated with the method embodiments can be executed or performed in any suitable order or sequence, which is not limited to the order and sequence shown in the figures and described above. For example, two consecutive processes may be executed substantially simultaneously where appropriate or in parallel to reduce latency and processing times, or be executed in an order reversed to that shown in the figures, depending on the functionality involved.

Further, the components in the figures associated with the device embodiments can be coupled in a manner different from that shown in the figures as needed. Some components may be omitted and additional components may be added.

As used in this disclosure, elements linked by the term "and/or" encompasses one or more of the elements and combinations thereof. For example, "A and/or B" means only A, only B, or A and B. Further, although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region, or section could be termed a second element, component, region, or section without departing from the disclosure.

The terminology used in this disclosure is for the purpose of describing particular embodiments only and is not intended to be limiting of the disclosure. As used here, the singular forms "a," "an," and "the" are intended to also include the plural forms, unless the context clearly indicates otherwise. Further, the terms "comprises" and/or "comprising," or "includes" and/or "including" specify the presence of stated features, regions, integers, steps, operations, elements, and/or components, but do not preclude the presence or addition of one or more other features, regions, integers, steps, operations, elements, components, and/or groups thereof.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A motion estimation method comprising:
   calculating a global camera motion vector for a region of an image frame;
   calculating a global estimated motion vector for the region of the image frame; and
   determining a global motion vector for the region based on the global camera motion vector and the global estimated motion vector, including:
      determining whether a confidence level of the global estimated motion vector is higher than a threshold;
      in response to the confidence level being not higher than the threshold level, determining the global camera motion vector as the global motion vector for the region; and
      in response to the confidence level being higher than the threshold level, determining whether a direction of the global estimated motion vector is consistent with a direction of the global camera motion vector;
      in response to the direction of the global estimated motion vector being not consistent with the direction of the global camera motion vector, determining the global estimated motion vector as the global motion vector for the region.

2. The motion estimation method of claim 1, further comprising:
   calculating the confidence level of the global estimated motion vector.

3. The motion estimation method of claim 1, wherein determining the global motion vector for the region further includes:
   in response to the direction of the global estimated motion vector being consistent with the direction of the global camera motion vector, determining whether an absolute value of the global estimated motion vector is consistent with an absolute value of the global camera motion vector.

4. The motion estimation method of claim 3, wherein determining the global motion vector for the region further includes:
   in response to the absolute value of the global estimated motion vector being not consistent with the absolute value of the global camera motion vector, determining the global estimated motion vector as the global motion vector.

5. The motion estimation method of claim 3, wherein determining the global motion vector for the region further includes:
   in response to the absolute value of the global estimated motion vector being consistent with the absolute value of the global camera motion vector:
      calculating a weighted average of the global estimated motion vector and the global camera motion vector; and
      determining the weighted average as the global motion vector for the region.

6. The motion estimation method of claim 2, wherein calculating the confidence level includes calculating an unflatness of the region as the confidence level of the global estimated motion vector of the region.

7. The motion estimation method of claim 6, wherein calculating the unflatness of the region includes:
   calculating pixel unflatnesses of a plurality of pixels in the region; and calculating the unflatness of the region by averaging the pixel unflatnesses of the plurality of pixels.

8. The motion estimation method of claim 1, wherein calculating the global estimated motion vector for the region includes:
   calculating block estimated motion vectors of a plurality of blocks in the region; and
   performing a weighted average of the block estimated motion vectors of the blocks to obtain the global estimated motion vector for the region.

9. The motion estimation method of claim 1, wherein calculating the global estimated motion vector for the region includes:
   calculating block estimated motion vectors of a plurality of blocks in the region; and
   selecting one of the block estimated motion vectors having a largest absolute value among the block estimated motion vectors as the global estimated motion vector for the region.

10. The motion estimation method of claim 1, wherein calculating the global estimated motion vector for the region includes calculating the global estimated motion vector for the region based on the image frame and a neighboring image frame.

11. The motion estimation method of claim 1, wherein calculating the global camera motion vector for the region includes:
    receiving camera attitude data from an inertial measurement unit coupled to an image capturing device capturing the image frame;
    mapping the camera attitude data to a two-dimensional (2D) image corresponding to the image frame to obtain 2D motion data; and
    calculating the global camera motion vector for the region based on the 2D motion data associated with the region.

12. The motion estimation method of claim 11, wherein calculating the global camera motion vector based on the 2D motion data associated with the region includes:
    calculating block camera motion vectors for a plurality of blocks in the region according to the 2D motion data associated with the region; and
    selecting one of the block camera motion vectors having a largest absolute value among the motion vectors as the global camera motion vector.

13. The motion estimation method of claim 11, wherein calculating the global camera motion vector for the region further includes aligning a timing of the camera attitude data with a timing of the image frame before mapping the camera attitude data.

14. The motion estimation method of claim 1, wherein the region is one of a plurality of regions in the image frame.

15. A video coding method comprising:
    determining one or more global motion vectors each corresponding to one of one or more regions of a first image frame, including, for each of the one or more regions:
       calculating a global camera motion vector for the region;
       calculating an global estimated motion vector for the region; and
       determining a global motion vector for the region based on the global camera motion vector and the global estimated motion vector, including:
          determining whether a confidence level of the global estimated motion vector is higher than a threshold;
          in response to the confidence level being not higher than the threshold level, determining the global camera motion vector as the global motion vector for the region; and
          in response to the confidence level being higher than the threshold level, determining whether a direction of the global estimated motion vector is consistent with a direction of the global camera motion vector;
          in response to the direction of the global estimated motion vector being not consistent with the direction of the global camera motion vector, determining the global estimated motion vector as the global motion vector for the region; and
    encoding a second image frame based on the first image frame and the one or more global motion vectors.

16. An imaging system comprising:
    an image capturing device configured to capturing a video; and
    an image processing device coupled to the image capturing device and including:
       a processor; and
       a memory storing instructions that, when executed by the processor, cause the processor to determine one or more global motion vectors each corresponding to one of one or more regions of an image frame of the video, including, for each of the one or more regions:
       calculate a global camera motion vector for the region;
       calculate a global estimated motion vector for the region; and
       determine a global motion vector for the region based on the global camera motion vector and the global estimated motion vector, including:
          determine whether a confidence level of the global estimated motion vector is higher than a threshold;
          in response to the confidence level being not higher than the threshold level, determine the global camera motion vector as the global motion vector for the region; and
          in response to the confidence level being higher than the threshold level, determine whether a direction of the global estimated motion vector is consistent with a direction of the global camera motion vector;
          in response to the direction of the global estimated motion vector being not consistent with the direction of the global camera motion vector, determining the global estimated motion vector as the global motion vector for the region.

* * * * *